US012441601B2

(12) United States Patent
Schulz-Hildebrandt et al.

(10) Patent No.: US 12,441,601 B2
(45) Date of Patent: Oct. 14, 2025

(54) FILLING NOZZLE

(71) Applicant: ELAFLEX HIBY GMBH & CO. KG, Hamburg (DE)

(72) Inventors: Lasse Schulz-Hildebrandt, Hamburg (DE); Matthias Fedde, Hamburg (DE)

(73) Assignee: ELAFLEX HIBY GMBH & CO. KG, Hamburg (DE)

( * ) Notice: Subject to any disclaimer, the term of this patent is extended or adjusted under 35 U.S.C. 154(b) by 166 days.

(21) Appl. No.: 18/569,036

(22) PCT Filed: Jun. 13, 2022

(86) PCT No.: PCT/EP2022/065952
§ 371 (c)(1),
(2) Date: Dec. 11, 2023

(87) PCT Pub. No.: WO2022/263341
PCT Pub. Date: Dec. 22, 2022

(65) Prior Publication Data

US 2024/0279047 A1 Aug. 22, 2024

(30) Foreign Application Priority Data

Jun. 14, 2021 (EP) .................................... 21179285

(51) Int. Cl.
*B67D 7/48* (2010.01)
*B67D 7/46* (2010.01)

(52) U.S. Cl.
CPC . *B67D 7/48* (2013.01); *B67D 7/46* (2013.01)

(58) Field of Classification Search
CPC ... B67D 7/48; B67D 7/44; B67D 7/46; B67D 7/52; B67D 7/42; B65B 3/26; B65B 3/30; B65B 57/14

(Continued)

(56) References Cited

U.S. PATENT DOCUMENTS 4,331,187 A * 5/1982 Trygg ...................... B67D 7/44 141/217
10,703,623 B1 * 7/2020 Main ........................ B67D 7/44
11,124,409 B2 * 9/2021 Carder ..................... B67D 7/48

FOREIGN PATENT DOCUMENTS

EP 2386520 A 12/2011

OTHER PUBLICATIONS

International Search Report, International Patent Application No. PCT/EP2022/065952, mailed Sep. 9, 2022, 2 pages.

* cited by examiner

*Primary Examiner* — David J Walczak
(74) *Attorney, Agent, or Firm* — CASIMIR JONES, S.C.; Brian F. Bradley

(57) ABSTRACT

A filling nozzle, comprising an inlet (13) for the connection of a fluid supply line, an outlet (14) for dispensing the fluid, a fluid channel (15), a coupling device (22) for converting a movement of a hand lever (17) into an actuation of a main valve (16) and a membrane (26) which separates a first membrane space (27) from a second membrane space (28) and which can be moved to actuate the coupling device (22) by a pressure difference existing between the first membrane space (27) and the second membrane space (28). A vacuum can be applied to the first membrane space (27), wherein a sensor line (19) opens into the first membrane space (27). The second membrane space (28) is sealed with respect to the fluid channel (15) and is fluidically connected via a ventilation channel (29) to the surroundings outside the filling nozzle, wherein the fluid flows around a part of the coupling device (22) situated outside the second membrane space (28) when the main valve (16) is opened.

12 Claims, 4 Drawing Sheets

Figure 1:
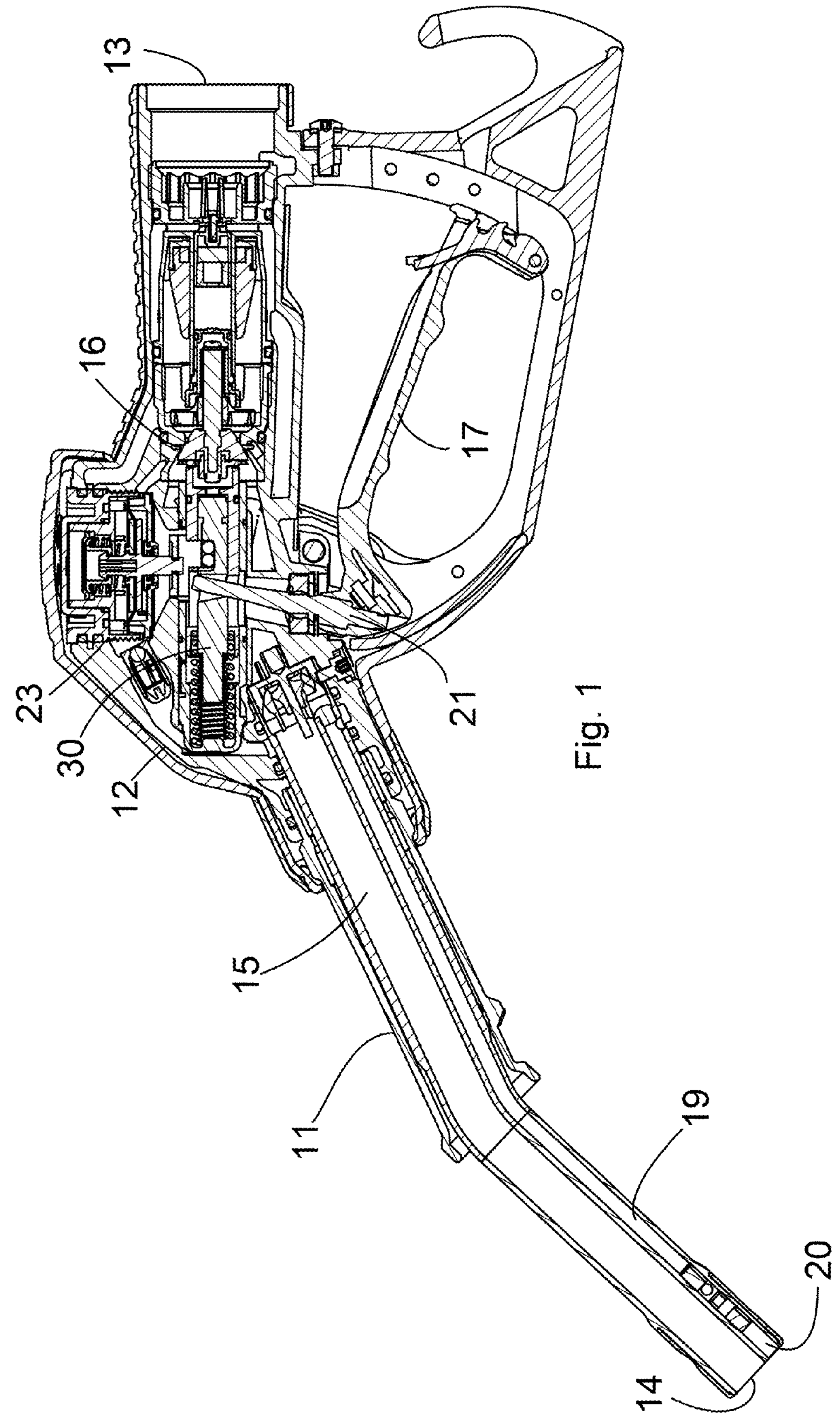

(58) Field of Classification Search
USPC ........... 222/64; 141/198, 206, 209, 217, 218
See application file for complete search history.

FILLING NOZZLE

The invention relates to a filling nozzle comprising an inlet for the connection of a fluid supply line and an outlet for dispensing a fluid. The inlet is connected to the outlet via a fluid duct, wherein a main valve is arranged in the fluid duct and is preloaded into a closed position against a valve seat. The filling nozzle also comprises a hand lever for actuating the main valve and a coupling device that is operatively connected to the hand lever and is designed, in the coupled state, to convert a movement of the hand lever into an actuation of the main valve. In the uncoupled state, the main valve is pushed into the closed position independently of the position of the hand lever. The filling nozzle also has a diaphragm that separates a first diaphragm space from a second diaphragm space and can be moved to actuate the coupling device by means of a pressure difference existing between the first diaphragm space and the second diaphragm space, wherein a vacuum can be applied to the first diaphragm space, and wherein a sensor line opens into the first diaphragm space.

Filling nozzles of this type are known from document EP 2 386 520 B1, for example. The sensor line can lead to a downstream end of an outlet tube, so that the sensor line is covered and closed by the liquid in the tank at the end of a filling process. Because a vacuum is applied to the first diaphragm space, the pressure in the first diaphragm space is reduced by the closure of the sensor line, which results in a movement of the diaphragm in the direction of the first diaphragm space. This movement can be utilized for the actuation of the coupling device. By being actuated, the coupling device can be displaced into the uncoupled state, in which the main valve is moved into the closed position independently of the position of the hand lever. In this way, fluid is prevented from being dispensed further and thus overflowing the tank after filling of the tank is complete.

A problem that arises in the prior art is that, to ensure that the coupling device is always triggered reliably and safely, a high degree of design complexity and a high level of maintenance must be applied.

Against this background, the object of the present invention is to provide a filling nozzle of the aforementioned type in which the triggering of the coupling device can be implemented more simply in design terms, more safely, and with less maintenance.

This object is achieved by the features of the independent claims. Advantageous embodiments are specified in the dependent claims. According to the invention, the second diaphragm space is sealed off from the fluid duct and is fluidically connected via a ventilation duct to the surroundings outside the filling nozzle, wherein the fluid flows around a part of the coupling device situated outside the second diaphragm space when the main valve is open.

First, a few terms used in the context of the invention are explained. The coupling device is designed, when in the coupled state, to convert a movement of the hand lever into an actuation of the main valve. It is not necessary for the coupling device to establish a direct connection between the hand lever and the main valve. Rather, it can be sufficient, for example, for the coupling device to couple the hand lever to a device for preloading the main valve into the closed position, so that this preloading can be compensated or suspended with the aid of the hand lever. The main valve can then be moved into the open position by a fluid pressure prevailing upstream, as is known from EP 2 386 520 B1, for example. Alternatively, the coupling device can also be designed to couple the hand lever to a fixed point, which acts as an abutment and only allows force transmission to the main valve on actuation of the hand lever, as is known from US 2018/037452 A1, for example. Further coupling devices that are known in principle to a person skilled in the art and can be actuated by a pressure-sensitive diaphragm are likewise included in the concept of the invention.

In filling nozzles from the prior art, it was usual for the space under the diaphragm to be connected to the fluid duct. This has the advantage that the fluid flows around the coupling device connected to the diaphragm when the main valve is open. In this way, the coupling device is continuously lubricated and impurities are washed away by the fluid, which is beneficial for proper performance and reduces maintenance.

In the context of the invention, however, it was found that the connection of the second diaphragm space to the fluid duct results in the disadvantage that the pressure under the diaphragm is influenced by the volumetric flow rate of the fluid. In the prior art, this could lead to unintentional actuation of the coupling device and thus to unintentional closing of the main valve at high volumetric flow rates or else in the event of flow turbulence and associated pressure peaks. The maximum volumetric flow rate therefore had to be limited in the solution known from the prior art.

However, by sealing the second diaphragm space off from the fluid duct and fluidically connecting it to the surroundings via a ventilation duct, the pressure inside the second diaphragm space can be kept constantly at the level of the ambient pressure independently of the volumetric flow rate. In this case, when a predefined vacuum is applied to the first diaphragm space, the coverage of the sensor line results in a defined pressure difference. The pressure difference between the first and second diaphragm spaces can thus be monitored much better, and therefore the coupling device can be actuated in a defined and safe manner. Since it is additionally provided for the fluid to flow around a part of the coupling device situated outside the second diaphragm space, flushing and lubrication of the coupling device by the fluid can take place despite the sealing of the second diaphragm space, and therefore the coupling device can be kept running smoothly for long periods without additional maintenance. Regular cleaning or the introduction of additional lubricants is not necessary.

In a preferred embodiment, the coupling device has a locking element for coupling the hand lever to a valve-actuating element. The locking element can preferably be moved into a coupling position and out of a coupling position by a movement of the diaphragm. For example, the valve-actuating element can have a first valve stem that is connected to the hand lever and can be coupled to a second valve stem by means of the locking element, wherein the second valve stem is preloaded in a closing direction by a restoring element and is designed to push the main valve into the closed position. In the coupled state, the force exerted by the restoring element can be compensated by means of the hand lever, so that the main valve is no longer pushed into the closed position and can be moved into the open position by a fluid pressure. The first valve stem can be designed as an inner valve stem, and the second valve stem can be designed as an outer valve stem that surrounds the inner valve stem concentrically. The locking element can have locking rollers or locking balls, for example.

It has been found that the locking element that couples the hand lever to the valve-actuating element can bump against corners or edges of the elements to be coupled and become stuck during the movement into the locking position or out of the locking position. In a preferred embodiment, the locking element is therefore positioned such that the fluid flows around it when the main valve is open. The continuous lubrication of the locking element enabled in this way when the main valve is open means that the locking element can slide into or out of the locking position more easily, and therefore the coupling process becomes much more reliable.

In an advantageous embodiment, the second diaphragm space is sealed off from the fluid duct by means of a cover, wherein the coupling device preferably has a connection element that is connected to the diaphragm and runs slidingly through a through-opening in the cover. The connection element preferably has a portion that is situated outside the second diaphragm space and is connected to the locking element. Because the connection element runs slidingly through the cover, the connection element can move relative to the cover when the diaphragm moves and in this way transfer the movement of the diaphragm to the locking element. Because the second diaphragm space is sealed off from the fluid duct, the pressure within the second diaphragm space is not influenced by the pressure conditions in the fluid duct.

Between the connection element and the cover there can be at least one sealing element, which is preferably designed as an O-ring, X-ring, diaphragm seal or lip seal. The connection element can have an outwardly facing circumferential groove, into which the sealing element is let. It is also possible for the through-opening in the cover to have an inwardly facing circumferential groove, into which the sealing element is let. In this way, the entire circumferential face of the connection element can be sealed against the cover. Because the sealing element is let into a groove, the sealing element is also protected securely from a displacement in the axial direction of the connection element.

The use of one or more ventilation ducts connecting the second diaphragm space to the surroundings in principle entails the risk that contaminants such as dust particles or liquids can penetrate into the second diaphragm space. In an advantageous embodiment, the at least one ventilation duct therefore opens into an opening of the filling nozzle that leads to the surroundings, wherein the opening is covered by a flexible protective covering such that pressure equalization is possible. Preferably, the ventilation duct also leads to the opening in a labyrinthine manner. In this way, any penetrating dirt particles cannot penetrate into the second diaphragm space, at least not directly, but must change direction multiple times in order to approach the diaphragm space along the labyrinthine duct. Entry of dirt can be considerably reduced or even completely prevented thereby.

In an advantageous embodiment, the diaphragm and the coupling device connected thereto are part of a safety shutoff module, which can be inserted into a housing of the filling nozzle. The modular design makes it possible to exchange the entire safety shutoff module in the event of malfunctions. The use of safety shutoff modules is known in principle from the prior art. The safety shutoff module can therefore in principle be compatible with previously known filling nozzles, and therefore the features according to the invention can be retrofitted in a filling nozzle from the prior art by exchanging the safety shutoff module.

In one embodiment, the filling nozzle can also have a shutoff device that moves the main valve into the closed position independently of a position of the hand lever when a liquid pressure at the inlet falls below a minimum value. The shutoff device is therefore triggered when the pressure falls below the minimum pressure, wherein such triggering preferably entails a movement of the diaphragm. Such an additional shutoff device is known in principle from the prior art (see EP 2 386 520, for instance). The shutoff device can be integrated in the safety shutoff module. Triggering of the shutoff device leads in a known manner to the diaphragm moving in the direction of the first diaphragm space and as a result releasing the coupling between the main valve and the hand lever (for example, by locking rollers being lifted out of a catch), so that the main valve is pushed into the closed position. By sealing off the second diaphragm space from the fluid duct according to the invention, a subsequent reset of the shutoff device, in which the diaphragm is moved back into the starting position (that is, in the direction of the second diaphragm space), can take place much more quickly and safely. In the prior art, fluid in particular had to be displaced out of the second diaphragm space through often narrow ducts during the reset movement of the diaphragm, which could cause problems in particular with viscous fluids (for example, when dispensing diesel at low temperatures). In contrast, thanks to the sealing of the second diaphragm space, fluid displacement is no longer necessary during resetting, and therefore the shutoff device can be reset reliably after being triggered.

The invention also relates to a filling pump having a filling hose and a filling nozzle according to the invention, wherein the filling hose is connected to the inlet of the filling nozzle. The filling pump can be refined by further features described in the context of the invention.

Figure 2:
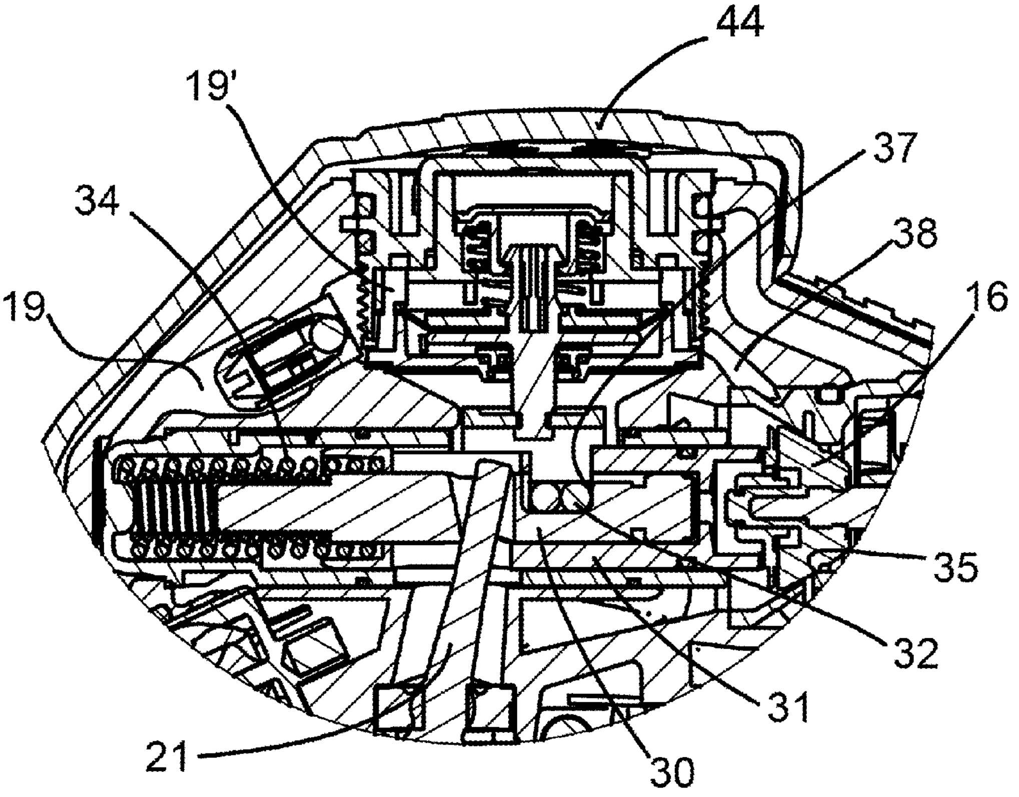
Figure 3:
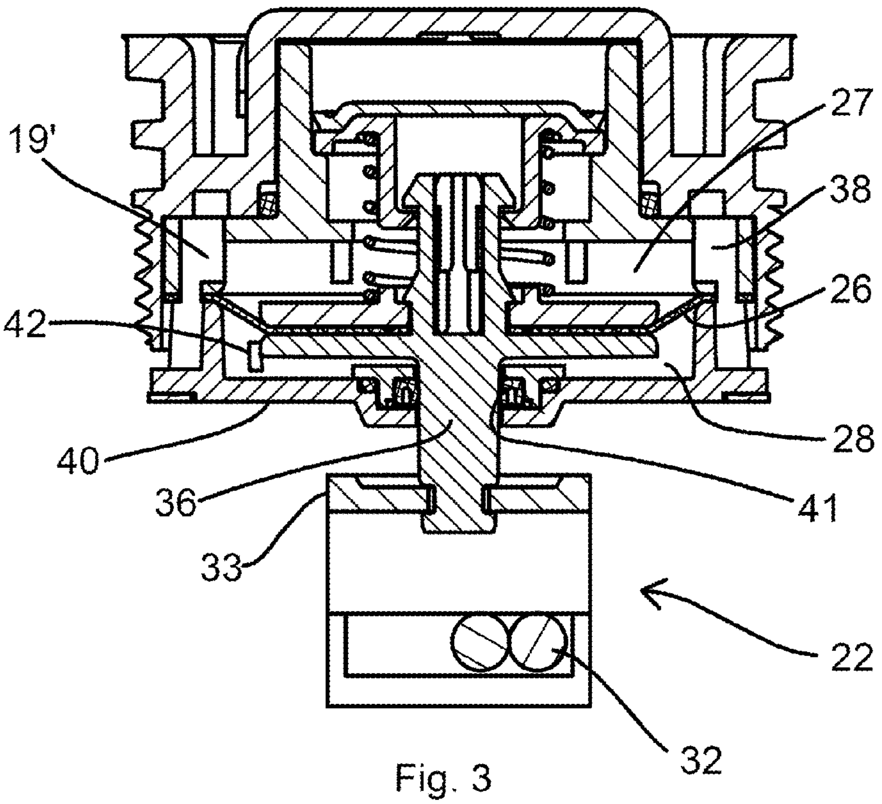
Figure 4:
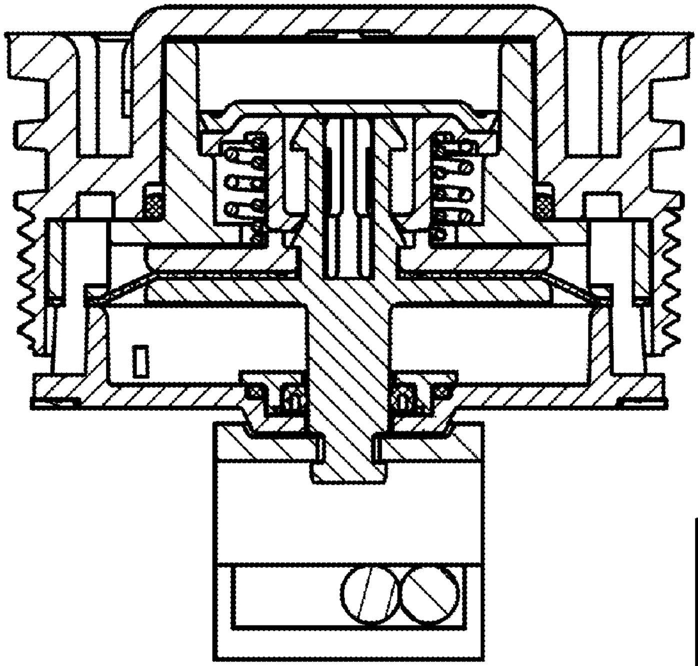
Figure 5A:
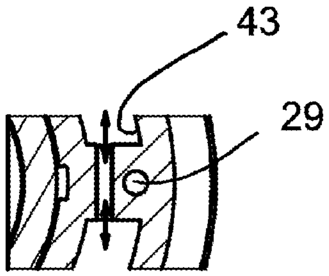
Figure 5:
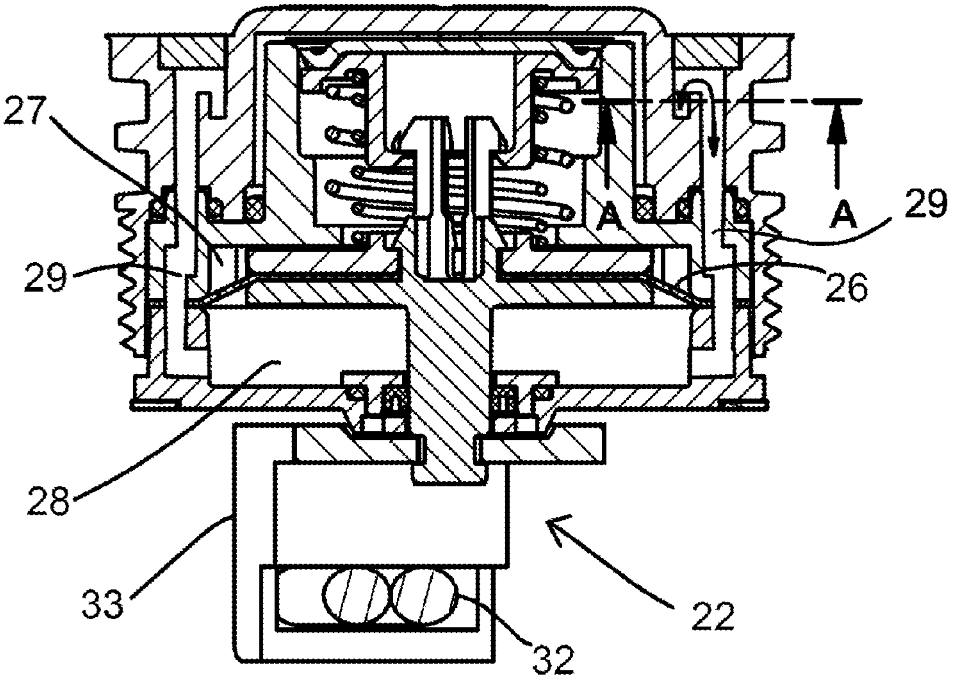
Figure 6:
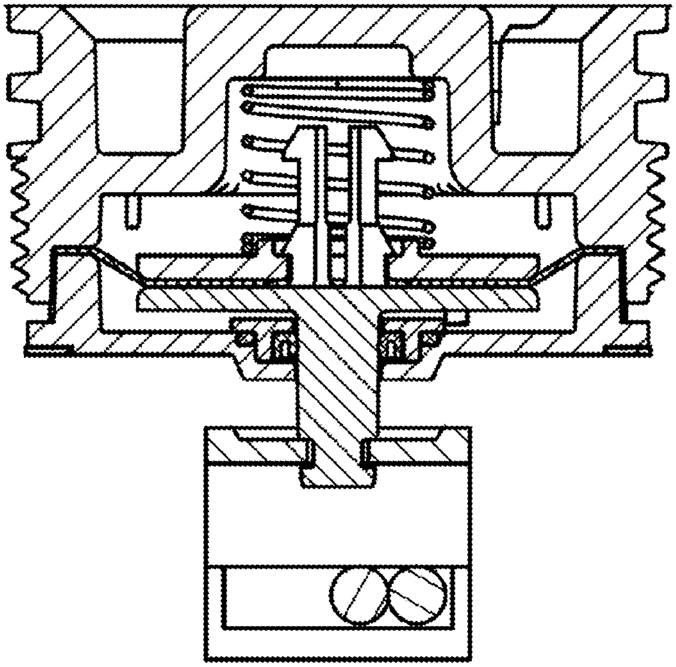
Figure 7:
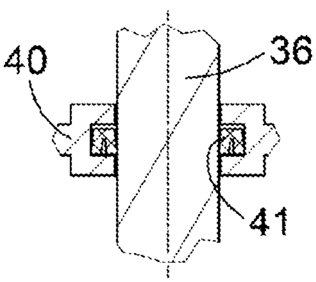
Figure 8:
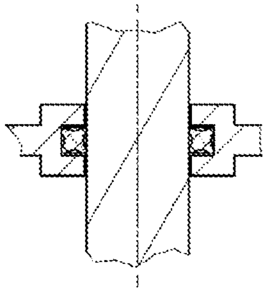
Figure 9:
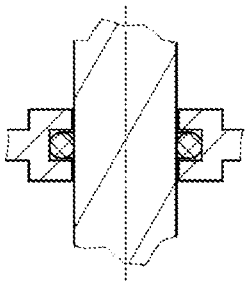
Figure 10:
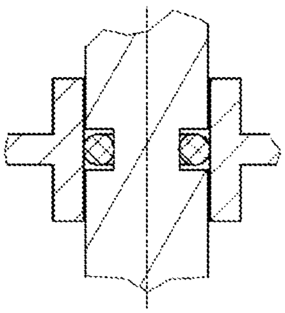
Figure 11:
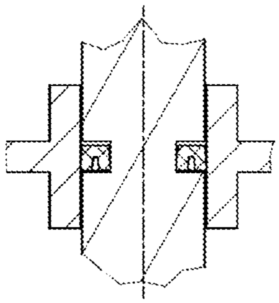
Figure 12:
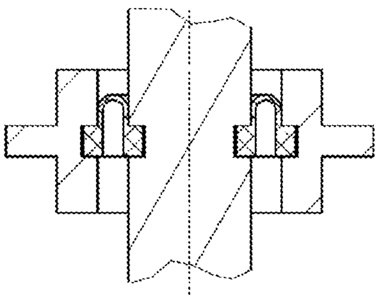

Advantageous embodiments of the invention are explained below by way of example with reference to the attached drawings. In the figures, FIG. 1: shows a filling nozzle according to the invention in a sectional side view;

FIG. 2: shows a detail of FIG. 1 in an enlarged view;

FIG. 3: shows the safety shutoff module shown in FIG. 2 in an enlarged view;

FIG. 4: shows the safety shutoff module of FIG. 3 in a different state;

FIG. 5: shows the safety shutoff module of FIG. 4 in a cross-sectional view along a different sectional plane;

FIG. 5*a*: shows a sectional view along line A-A shown in FIG. 5;

FIG. 6: shows a safety shutoff module of an alternative embodiment of a filling nozzle according to the invention;

FIG. 7: shows a detail view of a contact region between the connection element and the cover to illustrate an alternative embodiment;

FIG. 8: shows a detail view of a contact region between the connection element and the cover to illustrate a further alternative embodiment;

FIG. 9: shows a detail view of a contact region between the connection element and the cover to illustrate a further alternative embodiment;

FIG. 10: shows a detail view of a contact region between the connection element and the cover to illustrate a further alternative embodiment;

FIG. 11: shows a detail view of a contact region between the connection element and the cover to illustrate a further alternative embodiment;

FIG. 12: shows a detail view of a contact region between the connection element and the cover to illustrate a further alternative embodiment.

FIG. 1 shows a filling nozzle according to the invention having an inlet 13 to which a filling hose can be attached to supply a liquid fuel. The filling nozzle has a housing 12, into which a spout 11 is inserted. There is an outlet 14 at the end of the spout 11. The inlet 13 is connected to the outlet 14 via a fluid duct 15. In the fluid duct 15 there is a main valve 16, which is preloaded in a closing direction against a valve seat. The main valve 16 can be actuated by means of the hand lever 17.

To this end, the hand lever 17 is coupled in a fundamentally known manner by means of an actuating pin 21 to an inner valve stem 30, which can in turn be coupled by means of a coupling device to an outer valve stem. The coupling takes place by means of a safety shutoff module 23, which is inserted into the housing 12. The operating principle of the safety shutoff module 23 is explained in more detail below with reference to FIGS. 2 to 5.

FIG. 2 shows an enlarged detail of FIG. 1. FIG. 3 shows only the safety shutoff module 23 in an enlarged view. It can be seen that the filling nozzle has a closing spring 34, which pushes the outer stem 31 in the closing direction (upstream).

In the state shown in FIG. 2, the upstream end of the outer stem 31 bears against the downstream end of the main valve 16, so that the main valve 16 is pressed against the valve seat 35 and is thus held in the closed position.

In the state shown, the inner valve stem 30 is coupled to the outer valve stem 31 by means of a coupling device 22. To this end, the coupling device 22 comprises a locking roller retainer 33 in which locking rollers 32 are mounted. Both in the outer valve stem 31 and in the inner valve stem 30 there are locking openings 37, which are oriented to align with one another in the state shown in FIG. 2, wherein the locking rollers 32 are inserted into the locking openings 37. By means of the locking rollers 32, an axial movement of the inner valve stem 30 is transferred to the outer valve stem 31. When the hand lever is actuated, the actuating pin 21 is moved downstream, and the inner valve stem 30 is carried along by the actuating pin 21. Owing to the above-described coupling brought about by the locking rollers 32, the outer valve stem 31 is carried along by the inner valve stem 30 and in this way is lifted off from the main valve 16 counter to the closing force of the closing spring 34. The main valve 16 can then be moved into the open position by means of a fluid pressure prevailing upstream.

The coupling device 22 is actuated with the aid of a diaphragm 26 that separates a first diaphragm space 27 from a second diaphragm space 28. The coupling device 22 also comprises a connection element 36 that connects the diaphragm 26 to the locking roller retainer 33 in which the locking rollers 32 are mounted. In this way, a movement of the diaphragm 26 can be transferred to the locking rollers 32. In particular, the locking rollers 32 can be lifted upward out of the locking openings 37 by means of a movement of the diaphragm 26 in order to uncouple the inner valve stem 30 from the outer valve stem 31.

The filling nozzle also has a vacuum line 38 that connects a Venturi nozzle (not shown in the figures), which is positioned downstream of the main valve 16, to the diaphragm space 27 in order to apply a vacuum to the first diaphragm space. Moreover, the sensor line 19 opens into the first diaphragm space 27 in the region 19'. While the fuel is being dispensed, air and/or fuel vapors are sucked in from the surroundings via the vacuum line 38, the first diaphragm space 27 and the sensor line 19 at the downstream end of the sensor line 19. When the end of the sensor line 19 is covered by the fuel level at the end of a filling process, a negative pressure is produced in the first diaphragm space 27. This results in a movement of the diaphragm 26 upward in the direction of the first diaphragm space 27 (see FIG. 4), so that the locking rollers 32 are lifted out of the locking openings 37 in the manner explained above. The coupling between the inner valve stem 30 and the outer valve stem 31 is correspondingly released, and the outer valve stem 31 is pushed by the closing force of the closing spring 34 against the main valve 16, which is moved into the closed position thereby.

The second diaphragm space 28 is separated fluid-tightly from the fluid duct 15 by a cover 40. The fuel flowing through the fluid duct thus has no influence on the pressure within the second diaphragm space 28. The second diaphragm space 28 is also connected to the surroundings outside the filling nozzle via a ventilation duct 29. In the sectional view of FIG. 3, only the mouth 42 of the ventilation duct 29 can be seen. The labyrinthine profile of the ventilation duct 29 is shown in FIG. 5, which shows the elements shown in FIG. 3 along a different sectional plane. In particular, it can be seen in FIG. 5 and in FIG. 5*a*, which shows a sectional view along line A-A shown in FIG. 5, that several changes of direction take place along the ventilation duct 29, which prevents the penetration of dirt. The profile of the ventilation duct 29 is illustrated partially in FIGS. 5 and 5*a* by double arrows. It can in particular be seen in FIG. 5 that the ventilation duct, starting from the diaphragm space 28, runs initially radially outward (in relation to the axis of the connection element 36) and then upward, inward, upward, inward, and finally branches off downward. In FIG. 5*a*, it can be seen that the ventilation duct then branches off (in the view of FIG. 5*a* upward and downward) in the circumferential direction (in relation to the axis of the connection element 36) and thus opens into a free space 43, which can in principle be open toward the surroundings. In the present case, however, the free space 43 is covered by a protective covering 44 shown in FIG. 2 such that pressure equalization between the free space 43 and the surroundings is possible. To this end, it can be provided for gaps or ducts to remain between the protective covering 44 and the outer wall of the housing 12 of the filling nozzle in order to ensure pressure equalization. At the same time, the protective covering 44 prevents dirt being able to enter the free space 43 (or the ventilation duct 29). The connection of the second diaphragm space 28 to the surroundings means that a pressure corresponding to the ambient pressure is always produced in the second diaphragm space 28. In this way, the movement of the diaphragm 26 caused by the pressure difference prevailing between the diaphragm spaces 27, 28 and thus the actuation of the coupling device 22 can be implemented particularly safely and reliably.

The connection element 36 has a cylindrical portion, which runs through a corresponding through-opening in the cover 40. In the region of the through-opening there is an inwardly facing groove, into which a lip seal 41 is inserted. The lip seal 41 seals against the outer face of the cylindrical portion so that the pressure inside the diaphragm space 28 is not adversely affected by the pressure conditions in the fluid duct. At the same time, the lip seal 41 allows a sliding movement of the connection element 36 relative to the cover 40.

The region under the cover 40 is connected to the fluid duct 15. A fuel therefore flows around the locking roller retainer 33 and the locking rollers 32 while it is being dispensed. As a result, the locking rollers 32 are continuously lubricated, and impurities are prevented from being deposited.

The embodiment of FIGS. 1 to 5 also comprises a shutoff device that is integrated into the safety shutoff module 23 and is designed to move the main valve 16 into the closed position, independently of a position of the hand lever 17, when a liquid pressure at the inlet 13 falls below a minimum value. The shutoff device is designed in a manner known in principle and therefore shall not be described in detail here. In the states shown in FIGS. 2 to 4, a sufficient pressure prevails at the inlet 13 of the filling nozzle, so that the shutoff device is activated and the main valve can be opened with the aid of the hand lever. In the state shown in FIG. 5, the pressure prevailing at the inlet is lower than the minimum pressure. The coupling device is correspondingly in the uncoupled state and the main valve cannot be actuated.

FIG. 6 shows the safety shutoff module 23 of an alternative embodiment of a filling nozzle according to the invention. This embodiment differs from the embodiment of FIGS. 1-5 only by the omission of the above-described shutoff device.

FIGS. 7 to 12 each show partial views of alternative embodiments, in which in each case an enlarged cross-sectional view of the contact region between the connection element 36 and the cover 40 is illustrated. In the embodiments of FIGS. 7-9, the cover 40 has, in the region of the through-opening, an inwardly facing groove into which different types of sealing elements 41 are inserted in each case, namely an O-ring (FIG. 9), an X-ring (FIG. 8) and a lip seal (FIG. 7). In the region viewed, the connection element 36 is cylindrical, wherein the respective sealing element 41 bears against the cylindrical region in a ring shape.

In the embodiments of FIGS. 10 and 11, an outwardly open groove is let into the cylindrical region of the connection element 36. An O-ring is laid in this groove in the embodiment of FIG. 10, and a lip seal is laid in this groove in the embodiment of FIG. 11. In these embodiments, the through-opening in the cover 40 has a cylindrical inner face, which bears against the respective sealing element around its full circumference. In the embodiment of FIG. 12, an outwardly open groove is let into the cylindrical region of the connection element 36, and an inwardly open groove is let into the cylindrical region of the cover 40. A diaphragm-like sealing element (diaphragm seal) 41 is laid into these two grooves and ensures sealing by means of a flexible diaphragm without surfaces rubbing against one another.

Thanks to the seal types mentioned, good sealing can be achieved without excessively affecting the sliding ability between the cover 40 and the connection element 36.

The invention claimed is:

1. A filling nozzle, comprising an inlet (13) for a connection of a fluid supply line, an outlet (14) for dispensing the fluid, a fluid duct (15) connecting the inlet to the outlet, a main valve (16) that is situated in the fluid duct (15) and is preloaded into a closed position against a valve seat, a hand lever (17) for actuating the main valve (16), and a coupling device (22) that is operatively connected to the hand lever (17) and is designed, in a coupled state, to convert a movement of the hand lever (17) into an actuation of the main valve (16), wherein the main valve (16), in an uncoupled state, is pushed into the closed position independently of the position of the hand lever (17), wherein the filling nozzle also has a diaphragm (26) that separates a first diaphragm space (27) from a second diaphragm space (28) and can be moved to actuate the coupling device (22) by means of a pressure difference existing between the first diaphragm space (27) and the second diaphragm space (28), wherein a vacuum can be applied to the first diaphragm space (27), and wherein a sensor line (19) opens into the first diaphragm space (27), characterized in that the second diaphragm space (28) is sealed off from the fluid duct (15) and is fluidically connected via at least one ventilation duct (29) to surroundings outside the filling nozzle, wherein the fluid flows around a part of the coupling device (22) situated outside the second diaphragm space (28) when the main valve (16) is open.

2. The filling nozzle as claimed in claim 1, in which the coupling device has a locking element (32) for locking the hand lever to a valve-actuating element, wherein the locking element can be moved into a locking position and out of a locking position by a movement of the diaphragm.

3. The filling nozzle as claimed in claim 2, in which the locking element is positioned such that the fluid flows around it when the main valve is open.

4. The filling nozzle as claimed in claim 1, in which the second diaphragm space (28) is sealed off from the fluid duct (15) by means of a cover.

5. The filling nozzle as claimed in claim 4, in which at least one sealing element (41) is arranged between a connection element that is connected to the diaphragm and runs slidingly through a through-opening in the cover and the cover.

6. The filling nozzle as claimed in claim 5, wherein the at least one sealing element is an O-ring, an X-ring, a lip seal, or a diaphragm seal.

7. The filling nozzle as claimed in claim 5, in which the connection element has an outwardly facing circumferential groove, into which the sealing element (41) is let.

8. The filling nozzle as claimed in claim 5, in which the through-opening in the cover has an inwardly facing circumferential groove, into which the sealing element (41) is let.

9. The filling nozzle as claimed in claim 1, in which the ventilation duct extends in a labyrinthine manner as far as an opening that leads to the surroundings.

10. The filling nozzle as claimed in claim 9, wherein the ventilation duct is covered by a flexible protective covering (44) such that pressure equalization is possible.

11. The filling nozzle as claimed in claim 1, which also has a shutoff device that moves the main valve into the closed position independently of a position of the hand lever when a liquid pressure at the inlet falls below a minimum value.

12. A filling pump having a filling hose and a filling nozzle as claimed in claim 1, wherein the filling hose is connected to the inlet (13) of the filling nozzle.

* * * * *